(12) United States Patent
Liu et al.

(10) Patent No.: US 10,452,089 B2
(45) Date of Patent: Oct. 22, 2019

(54) METHOD AND APPARATUS FOR CONTROLLING TURN-ON AND TURN-OFF OF SMART SOCKET

(71) Applicant: Xiaomi Inc., Beijing (CN)

(72) Inventors: Xin Liu, Beijing (CN); Yue Liang, Beijing (CN); Enxing Hou, Beijing (CN)

(73) Assignee: XIAOMI INC., Beijing (CN)

( * ) Notice: Subject to any disclaimer, the term of this patent is extended or adjusted under 35 U.S.C. 154(b) by 337 days.

(21) Appl. No.: 15/007,621

(22) Filed: Jan. 27, 2016

(65) Prior Publication Data

US 2016/0224043 A1    Aug. 4, 2016

(30) Foreign Application Priority Data

Jan. 29, 2015    (CN) .......................... 2015 1 0048269

(51) Int. Cl.
*H04L 29/08* (2006.01)
*G05B 15/02* (2006.01)
*H01R 13/66* (2006.01)
*G05F 1/625* (2006.01)
(Continued)

(52) U.S. Cl.
CPC .............. *G05F 1/625* (2013.01); *G05B 15/02* (2013.01); *H04L 67/125* (2013.01); *H01R 13/6691* (2013.01); *H01R 24/76* (2013.01); *H04L 69/28* (2013.01)

(58) Field of Classification Search
CPC .......... G05B 15/00; G05B 15/02; H04L 67/12
See application file for complete search history.

(56) References Cited

U.S. PATENT DOCUMENTS

| | | |
|---|---|---|
| 7,181,360 B1 | 2/2007 | Nikolac et al. |
| 2005/0052814 A1* | 3/2005 | McNally ................. G06F 1/206 361/166 |
| 2012/0057379 A1 | 3/2012 | Aiello |

(Continued)

FOREIGN PATENT DOCUMENTS

| | | |
|---|---|---|
| CN | 201707570 U | 1/2011 |
| CN | 102856741 A | 1/2013 |

(Continued)

OTHER PUBLICATIONS

International Search Report dated Mar. 10, 2016 for Chinese Application No. PCT/CN2015/093070, 5 pages.

(Continued)

*Primary Examiner* — Vladimir Magloire
*Assistant Examiner* — Donald H B Braswell
(74) *Attorney, Agent, or Firm* — Brinks Gilson & Lione

(57) ABSTRACT

The present disclosure relates to a method and an apparatus for controlling turn-on and turn-off of an electric current supplied by a smart socket. The method includes retrieving a timing instruction used for controlling turn-on and turn-off of the electric current, and controlling on and off of an electric current to a device connected to a smart socket according to the timing instruction. The timing instruction is stored in the smart socket and a control device. The control device is wirelessly connected with the smart socket. The present disclosure improves the reliability of controlling turn-on and turn-off of an electric current supplied by the smart socket.

17 Claims, 5 Drawing Sheets

(51) Int. Cl.
*H04L 29/06* (2006.01)
*H01R 24/76* (2011.01)

(56) References Cited

U.S. PATENT DOCUMENTS

| | | | |
|---|---|---|---|
| 2012/0119577 A1* | 5/2012 | Clarke | H02J 3/14 |
| | | | 307/40 |
| 2012/0331156 A1 | 12/2012 | Colpitts et al. | |
| 2013/0245849 A1 | 9/2013 | Paul et al. | |
| 2014/0006506 A1 | 1/2014 | Frei et al. | |
| 2014/0088780 A1* | 3/2014 | Chen | G05F 1/66 |
| | | | 700/295 |
| 2014/0351374 A1* | 11/2014 | Canoy | H04L 67/10 |
| | | | 709/217 |
| 2015/0249735 A1* | 9/2015 | Miller | H04H 20/08 |
| | | | 455/420 |

FOREIGN PATENT DOCUMENTS

| | | |
|---|---|---|
| CN | 102882077 A | 1/2013 |
| CN | 202678646 U | 1/2013 |
| CN | 202917747 U | 5/2013 |
| CN | 103178410 A | 6/2013 |
| CN | 103401102 A | 11/2013 |
| CN | 203324759 U | 12/2013 |
| CN | 103699079 A | 4/2014 |
| CN | 103914967 A | 7/2014 |
| CN | 203859339 U | 10/2014 |
| CN | 104158031 A | 11/2014 |
| CN | 104201515 A | 12/2014 |
| CN | 104678851 A | 6/2015 |
| EP | 3 051 776 B1 | 9/2017 |
| JP | 2003-508002 A | 2/2003 |
| JP | 2013-198269 A | 9/2013 |
| JP | 2015-005856 A | 1/2015 |
| RU | 130 098 U1 | 7/2013 |
| WO | WO 2013/031886 A1 | 3/2013 |
| WO | WO 2014/117861 A1 | 8/2014 |

OTHER PUBLICATIONS

English Translation of International Search Report dated Feb. 14, 2016 for International Application No. PCT/CN2015/093070, 4 pages.
Extended European Search Report dated May 6, 2016 for European Application No. 16152565.4, 11 pages.
Kato, Takekazu et al., "i-Energy Profile: Informationization Profile by Smart-Tap Network," IEICE Transactions, vol. J94-B, No. 10, pp. 2011, 1232-1245.
Maeda, Tomotaka et al., "Design and Implementation of an On-Demand Home Power Management System with the Protocol Hierarchy," IPSJ SIG Technical Report, vol. 2014-GC-90, No. 20, 2014, 8 pages.
Office Action dated Dec. 1, 2016 for Chinese Application No. 201510048269.1, 10 pages.
Office Action dated Apr. 4, 2017 for Japanese Application No. 2016-571463, 9 pages.
Office Action dated Aug. 10, 2017 for Russian Application No. 2016110980/11, 9 pages.
Office Action dated Oct. 13, 2017 for Mexican Application No. Mx/a/2016/001548, 4 pages.
Notice of Allowance dated May 15, 2018 for Japanese Application No. 2016-571463, 4 pages.

* cited by examiner

METHOD AND APPARATUS FOR CONTROLLING TURN-ON AND TURN-OFF OF SMART SOCKET

CROSS-REFERENCE TO RELATED APPLICATIONS

This application is based upon and claims priority to Chinese Patent Application No. 201510048269.1, filed Jan. 29, 2015, the entire contents of which are incorporated herein by reference.

TECHNICAL FIELD

The present disclosure relates to smart home systems, and more particularly, to a method and an apparatus for controlling turn-on and turn-off of a smart socket.

BACKGROUND

A smart socket usually refers to a socket with a built-in Wi-Fi module, and can be remotely controlled to turn on and off by a client installed in a smart phone. Timing information of the smart socket, such as a corresponding timing instruction (turn-on or turn-off) being executed at a certain time, may be set by the client installed in the smart phone, so that a user can conveniently control an electric equipment, such as a water heater, connected to the smart socket.

SUMMARY

The present disclosure provides a method and an apparatus for controlling turn-on and turn-off of a smart socket.

According to a first aspect of embodiments of the present disclosure, there is provided a method for controlling turn-on and/or turn-off of a smart socket. The method is performed by a control device, and the control device may be wirelessly connected with the smart socket. The method includes receiving timing information used for controlling turn-on and turn-off of an electric current supplied by the smart socket, the timing information including a predetermined time, and a timing instruction corresponding to the predetermined time, and in response to determining that a current time has reached the predetermined time, sending the timing instruction corresponding to the predetermined time to the smart socket, the timing instruction being used for controlling the electric current supplied by the smart socket to an electric device connected to the smart socket based on the timing instruction. The electric current is supplied to an electric equipment connected to the smart socket.

According to a second aspect of embodiments of the present disclosure, there is provided a method for controlling turn-on and turn-off of an electric current supplied by a smart socket. The method is performed by the smart socket, and the method includes receiving or retrieving a timing instruction used for controlling turn-on and turn-off of the smart socket, the timing instruction being stored in the smart socket or a control device, the control device being wirelessly connected with the smart socket, and controlling on and off of an electric current supplied by the smart socket based on the timing instruction.

According to a third aspect of embodiments of the present disclosure, there is provided an apparatus for controlling turn-on and turn-off of an electric current supplied by a smart socket. The apparatus is provided in the smart socket, and the apparatus includes an instruction receive module configured to receive a timing instruction used for controlling turn-on and turn-off of the electric current, the timing instruction being stored in the smart socket or a control device, the control device being wirelessly connected with the smart socket, and a turn-on and turn-off control module configured to control on and off of the electric current supplied by the smart socket based on the timing instruction.

According to a fourth aspect of embodiments of the present disclosure, there is provided a control device. The control device may be wirelessly connected with the smart socket, and the control device includes a processor, and a memory for storing instructions executable by the processor. The processor is configured to receive timing information used for controlling turn-on and turn-off of an electric current supplied by the smart socket, the timing information including a predetermined time, and a timing instruction corresponding to the predetermined time; and when determining that current time arrives at the predetermined time, send the timing instruction corresponding to the predetermined time to the smart socket, so that the smart socket controls on and off of the electric current based on the timing instruction.

According to a fifth aspect of embodiments of the present disclosure, there is provided a smart socket, and the smart socket includes a processor, and a memory for storing instructions executable by the processor. The processor is configured to acquire a timing instruction used for controlling turn-on and turn-off of an electric current supplied by the smart socket to an electric device connected to the smart socket, the timing instruction being stored in the smart socket or a control device, the control device being wirelessly connected with the smart socket, and control on and off of the electric current based on the timing instruction.

According to a sixth aspect of embodiments of the present disclosure, there is provided an apparatus for controlling turn-on and turn-off of an electric current supplied by a smart socket, and the apparatus includes an instruction retrieving module configured to, when determining that current time arrives at a predetermined time, retrieve stored timing information, the timing information including a corresponding smart socket, the predetermined time, and a timing instruction corresponding to the predetermined time, and an instruction sending module configured to send the timing instruction to the corresponding smart socket via a local area network, the timing instruction being used for controlling the smart socket to control on and off of the electric current supplied by the smart socket based on the timing instruction.

According to a seventh aspect of embodiments of the present disclosure, there is provided a non-transitory computer-readable storage medium having stored therein instructions that, when executed by a processor of a smart socket, causes the smart socket to perform a method for controlling turn-on and turn-off of an electric current supplied by a smart socket. The method including when determining that current time arrives at a timing, retrieving stored timing information, the timing information including a corresponding smart socket, the predetermined time, and a timing instruction corresponding to the predetermined time, and sending the timing instruction to the corresponding smart socket via a local area network, the timing instruction being used for controlling the smart socket to control on and off of the electric current based on the timing instruction.

According to an eighth aspect of embodiments of the present disclosure, there is provided a non-transitory computer-readable storage medium having stored therein instructions that, when executed by a processor of a smart socket, causes the smart socket to perform a method for controlling turn-on and turn-off of an electric current supplied by a smart socket. The method including retrieving or receiving a timing instruction used for controlling on and off of current, the timing instruction being locally stored, or being stored in a control device sending the timing instruction via a local area network, and controlling on and off of the electric current supplied by the smart socket based on the timing instruction.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figures 1, 2:
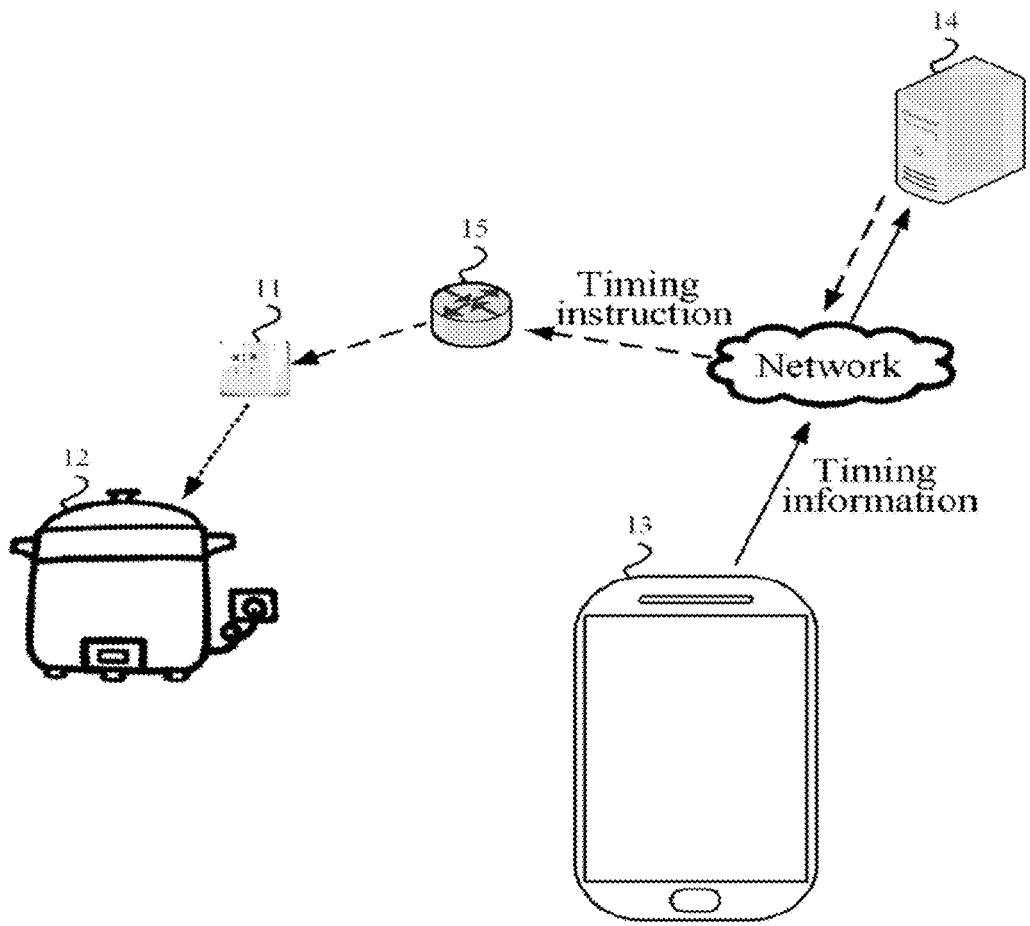
FIG. 1 shows an application scenario of a method for controlling turn-on and turn-off of a smart socket, according to an exemplary embodiment.
FIG. 2 is a flow chart of a method for controlling turn-on and turn-off of a smart socket, according to an exemplary embodiment.

"Smart socket" is a simple and useful smart single product, and is usually provided with a built-in Wi-Fi module, a user can remotely control on and off of current of the smart socket through a client installed in a smart phone. FIG. 1 illustrates how the smart socket is controlled by using an example of an optional scenario. As shown in FIG. 1, an electric equipment may be accessed to the smart socket 11, for example, an electric rice cooker 12 inserted in the smart socket. The user needs to control on and off of the current of the smart socket 11 (i.e. to control turn-on and turn-off of the smart socket) through the client installed in his/her own smart phone 13 (such as a home control APP), so that the electric rice cooker 12 is in a working state or an off state, thus realizing an intelligent control to the electric equipment. Specifically, when the smart socket 11 is turned on, it provides an electric current to the electric rice cooker 12 such that the electric rice cooker 12 can be powered on. When the smart socket 11 is turned off, it does not provide an electric current to the electric rice cooker 12 such that the electric rice cooker 12 is powered off.

The process of controlling the smart socket by the client installed in the smart phone is as follows: the user can provide timing information used for controlling turn-on and turn-off of the smart socket by the client installed in the smart phone 13. The timing information may include: a predetermined time, and a timing instruction corresponding to the predetermined time. It should be noted that, the timing information may not only include the predetermined time and the timing instruction, but also may include other contents, such as a timing identification, which is not limited by the present embodiment. The following Table 1 illustrates a timing information:

TABLE 1

Timing information table

| Timing ID | Predetermined time | Timing instruction |
|---|---|---|
| 00000001 | 9:00 | on |
| 00000002 | 10:00 | off |

As shown in the above Table 1, the above timing information may include a timing ID (i.e. a timing identification), which is a number assigned to each time and the corresponding timing instruction, wherein "on" in the timing instruction means that the smart socket is in an energized state, i.e. power-up state, and "off" means that the smart socket is in an off state, on and off of the current of the smart socket may be controlled through the instruction. In addition, the above timing information is not necessarily stored in the form of the table shown in Table 1, but also may be stored as other forms. Of course, optionally, the timing information may not include the timing identification, but only include the predetermined time and the timing instruction.

After the above timing information is set in the client on the smart mobile, the timing information may be uploaded to a server 14 via a network (see a solid arrow path in FIG. 1), the server 14 stores the timing information, and may send the timing instruction corresponding to the predetermined time to the smart socket 11 through a dotted line arrow path in FIG. 1 (via a router 15) when it arrives at the predetermined time in the timing information. For example, when determining that it is the predetermined time 10:00, the server 14 sends the timing instruction "off" to the smart socket 11. Of course, the specific expression manner of the instruction is not limited by the present embodiment, for example, "00" is used to express "on", and "01" is used to express "off". After the smart socket 11 receives the instruction, a processor inside the smart socket controls a circuit structure of the smart socket to power off based on the instruction. In addition, when the server 14 sends the timing instruction, other contents except the instruction may also be contained at the same time, for example, the timing ID may also be sent to the smart socket 11 along with the timing instruction.

In a practical application, a wired network between the router 15 and the server 14 may have a blocked state, such as when the network is broken, and then the timing instruction of the server cannot be sent to the smart socket 11 at the predetermined time, giving rise to safety risks of the electric equipment inserted in the smart socket. Regarding this issue, the method for controlling turn-on and turn-off of a supply of electric current by the smart socket of embodiments of the present disclosure may improve the reliability of controlling turn-on and turn-off of the smart socket. According to the method, even though the wired network between the router 15 and the server 14 fails, the smart socket 11 is still able to power off on time, which is safe and reliable.

FIG. 2 illustrates a flow chart of a method for controlling turn-on and turn-off of a smart socket. The method may be performed by a control device connected with the smart socket via a local area network, for example, the control device may be a router. As shown in FIG. 2, the method may include the following steps.

At step 201, when determining that current time arrives at a predetermined time, stored timing information is retrieved. The timing information includes a corresponding smart socket identification, the predetermined time, and a timing instruction corresponding to the predetermined time.

For example, before determining that the current time arrives at the predetermined time, the control device of the present embodiment can receive the timing information used for controlling turn-on and turn-off of the smart socket from a server. The timing information includes the predetermined time, and the timing instruction corresponding to the predetermined time. The timing information may also include a corresponding smart socket identification. The above predetermined time and the timing instruction are used for controlling on and off of the supply of electric current by the corresponding smart socket. In the timing information, a device identification may be used to indicate the corresponding smart socket, i.e. containing the device identification of the smart socket corresponding to the predetermined time and the timing instruction.

For example, when the control device is a router, the router receives the timing information sent by the server. As shown by also referring to FIG. 1, when receiving the timing information sent by the smart phone 13, the server 14 can forward the timing information to the router 15 through the dotted line arrow path in FIG. 1, and the router 15 stores the timing information.

When determining that the current time arrives at the predetermined time, the control device retrieves the timing information corresponding to the predetermined time. For example, when the control device is a router, the router will determine the time. When determining that the time arrives at the predetermined time in the timing information stored beforehand, for example, in step 201, the router can retrieve the timing information, which includes the device identification of the corresponding smart socket associated with the predetermined timing, and the timing instruction corresponding to the predetermined time.

At step 202, the timing instruction is sent to the corresponding smart socket via a local area network. The timing instruction is used for controlling the smart socket to control on and off of the current according to the timing instruction.

In the present embodiment, the control device can send the timing instruction corresponding to the predetermined time to the corresponding smart socket via the local area network, the timing instruction being used for controlling the smart socket to control on and off of the supply of an electric current according to the timing instruction. For example, when determining that it has reached the time 10:00, according to the device identification included in the timing information, the router sends the instruction "off" to the smart socket 11 corresponding to the device identification via the local area network.

The control device sends the timing instruction to the smart socket via the local area network. This instruction sending manner is able to make the sending of the instruction more reliable. For example, the control device is a router, and the router is connected with the smart socket via a local area network, such as a wireless connection. When a wired network between the router and the server fails, causing that the server cannot normally send the timing instruction to the smart socket, the network between the router and the smart socket is still able to normally transmit the instruction, so that on and off of the smart socket based on the timing instruction is ensured, thus improving the reliability of controlling turn-on and turn-off of the smart socket.

Optionally, the timing information respectively corresponding to a plurality of smart sockets may be stored on the same control device. When the control device stores the timing information of a plurality of smart sockets and the current time reaches at the predetermined time, the control device can determine the smart socket associated with the timing information according to the device identification in the timing information corresponding to the predetermined time, and send the timing instruction to the smart socket. Optionally, if there is a plurality of associated smart sockets, the control device can send the timing instruction to each of the associated smart sockets respectively. The control device may send the timing instructions along with identifiers for the associated smart sockets. Each of the associated smart sockets may monitor the transmitted timing instructions and determine whether the timing instructions are destined to itself based on the identifiers. Alternatively, the control device may send the timing instructions to all the associated smart sockets without identifiers. In this example, the control device may control the associated smart sockets based on the same timing instructions. For example, the control device may send out the same timing instructions to all the associated smart sockets that turn off electric current at a certain time, for example 12 am, in order to prevent any danger of fire while a user is asleep.

Figure 3:
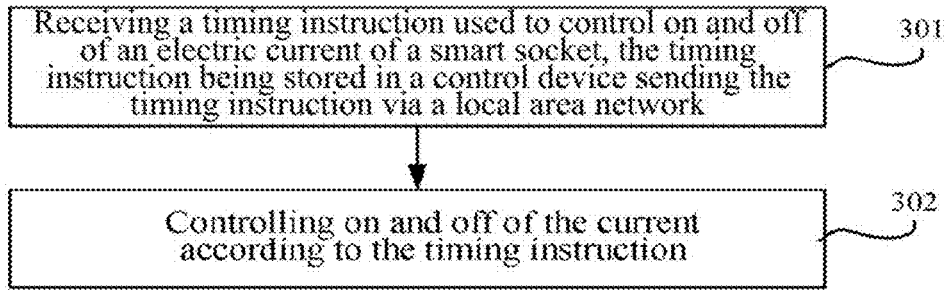
FIG. 3 is a flow chart of another method for controlling turn-on and turn-off of a smart socket, according to an exemplary embodiment.

Corresponding to the process of sending the instruction by the router shown in FIG. 2, FIG. 3 illustrates a flow chart of a method for controlling turn-on and turn-off of a smart socket. The method may be a process of receiving the instruction performed by the smart socket. As shown in FIG. 3, the method includes the following steps.

At step 301, a timing instruction used for controlling on and off of a supply of an electric current by a smart socket is received. The timing instruction is stored in a control device sending the timing instruction via a local area network.

For example, when the control device is a router, the router stores the timing instruction, and the smart socket receives the timing instruction sent by the router when determining that the predetermined time arrives.

At step 302, on and off of the current is controlled according to the timing instruction. For example, the smart socket controls on and off of the supply of an electric current according to the instruction received from the router. For instance, when the instruction is "off", the smart socket controls its internal circuit to power off the current.

Figure 4:
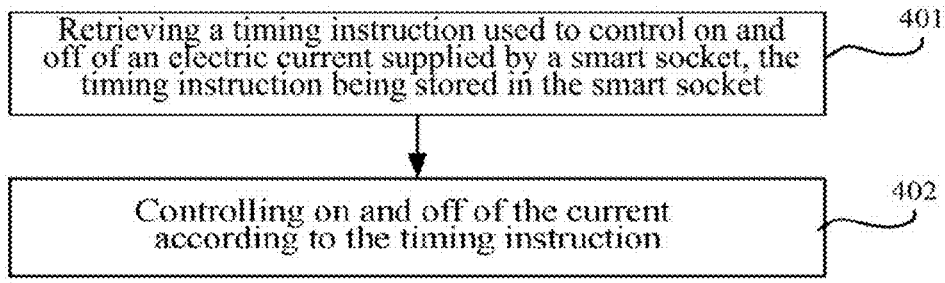
FIG. 4 is a flow chart of a yet another method for controlling turn-on and turn-off of a smart socket, according to an exemplary embodiment.

FIG. 4 illustrates a flow chart of another method for controlling turn-on and turn-off of a smart socket. The method may be performed by the smart socket. In the process, the instruction retrieved by the smart socket may be stored in the smart socket itself. The method includes the following steps.

At step 401, a timing instruction used for controlling on and off of an electric current supplied by a smart socket is retrieved. The timing instruction is stored in the smart socket.

For example, the smart socket stores the timing instruction, which may be stored in a memory of the smart socket. And, the memory stores the timing information, and the above timing instruction is stored in the timing information. For example, the timing information stored in the memory may be the form as shown in the above Table 1.

In the present step, the smart socket may check a current time, and determine whether the current time arrives at the predetermined time in the timing information stored in the memory of the smart socket. When the current time reaches the predetermined time, the smart socket retrieves the timing instruction corresponding to the timing information.

At step 402, on and off of the current is controlled according to the timing instruction.

In the method for controlling turn-on and turn-off of a smart socket of embodiments of the present disclosure, the control device, such as the router, sends the timing instruction to the smart socket via the local area network, or the current is controlled by the smart socket itself according to the timing instruction, which is independent of sending the instruction by the server, even though a network's failure results in that the server cannot send the instruction to the smart socket, the smart socket can also acquire the timing instruction from the router or the smart socket itself, and thus turn-on and turn-off controls of the smart socket are safely and reliably performed.

In the following three practical implementations, for example, application scenarios of several optional methods for controlling turn-on and turn-off of the smart socket are schematically described.

Figure 5:
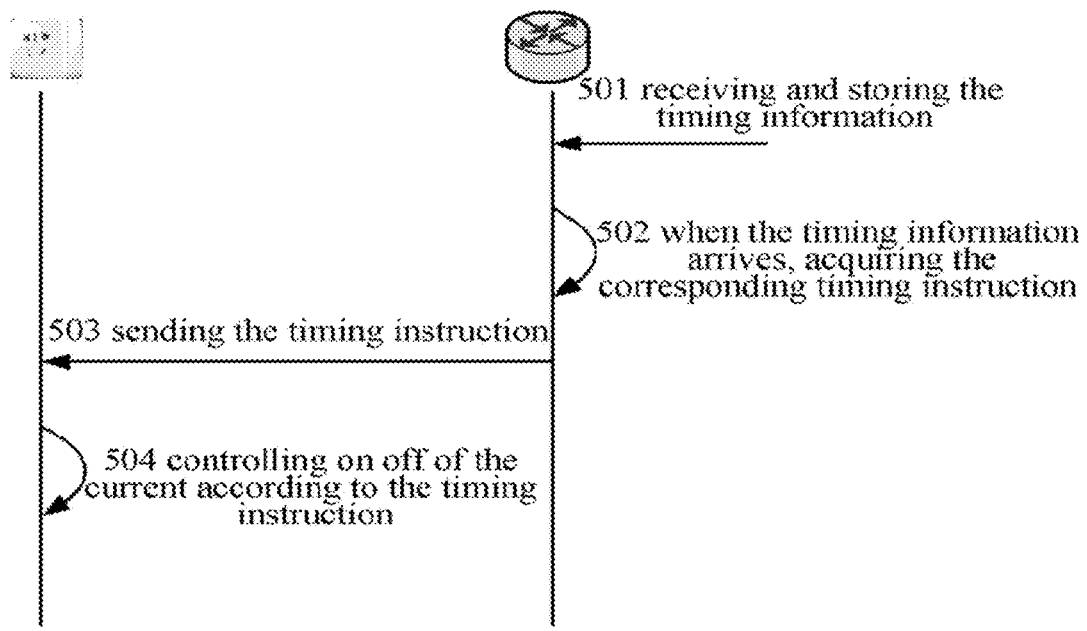
FIG. 5 is a flow chart of an application of a method for controlling turn-on and turn-off of a smart socket, according to an exemplary embodiment.

In one embodiment, referring to FIG. 5, schematically, the timing instruction may be sent to the smart socket by the router, and the smart socket can control on and off of the current according to the received instruction sent by the router. The process is as follows.

At step 501, a control device receives and stores timing information. For example, the router can receive the timing information sent by the server. The timing information includes the predetermined time and the timing instruction (as the example shown in Table 1). When storing the timing information, a corresponding relationship between the predetermined time and the timing instruction also needs to be saved. The timing information of the server may be received from a user's smart phone.

At step 502, when determining that the current time has reached the predetermined time, the control device acquires a timing instruction in timing information. For example, the router can check the current time in real time. If the current time reaches the predetermined time, for example, reaches 10:00, the router can retrieve the timing instruction, such as "off", corresponding to the predetermined time from the timing information stored therein. The router can also retrieve the device identification of an associated smart socket in the timing information, so as to know which smart socket is related with the timing information.

At step 503, the control device sends the timing instruction to the smart socket. For example, the router sends the timing instruction "off" to the smart socket corresponding to the device identification, according to the device identification of the corresponding smart socket in the timing information. If the timing information corresponds to a plurality of smart sockets, the router can send the timing instruction to each smart socket respectively according to the timing information. While sending, the timing instruction may be sent with an instruction identification understandable by the smart socket. For example, an identification of "01" is used to indicate the timing instruction "off". And, the control device of the present embodiment sends the timing instruction to the smart socket via the local area network.

At step 504, the smart socket controls on and off of the supply of an electric current by the smart socket according to the timing instruction. For example, when the instruction received by the smart socket is off, the smart socket will control off of the current.

Figure 6:
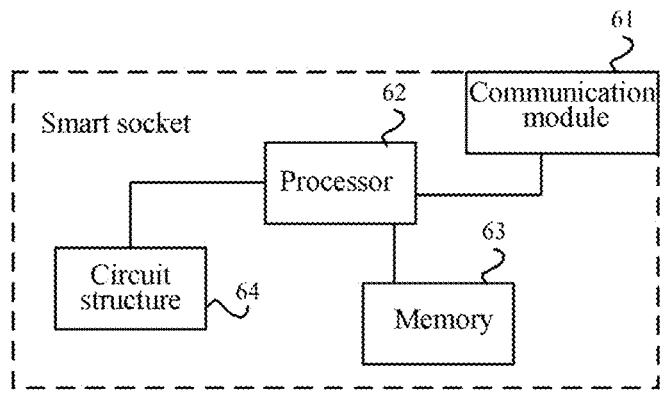
FIG. 6 is a block diagram of an apparatus for controlling turn-on and turn-off of a smart socket, according to an exemplary embodiment.

In another embodiment, schematically, the smart socket itself can also store timing information, and the time is checked by the smart socket itself, and the instruction is executed when the current time reaches at the predetermined time. Referring to FIG. 6, a structural block diagram of one example of the smart socket is shown. The smart socket may include a communication module 61, a processor 62, and a memory 63, and may also include a circuit structure 64. The circuit structure 64 may be a relay circuit. The smart socket may further include a digital clock circuit such as a timer or a clock (not shown in FIG. 6). The digital clock circuit may be used to check the current time and determine whether the current time reaches at a predetermined time. The digital clock circuit may synchronize the smart socket with the server or the control device. Alternatively, the smart socket may not include a timer or a clock, but instead may receive a message that the current time reaches at a predetermined time from the control device or the server. Logic instructions executable by the processor are stored in the memory 63, and the processor 62 can execute the following processes by executing the logic instructions.

For example, the communication module 61 may be a WiFi module, which can receive timing information sent by the server. The timing information includes a predetermined time and a timing instruction corresponding to the predetermined time, similar as shown in Table 1. The processor 62 of the smart socket can send the timing information obtained by the communication module 61 to the memory 63 to store. The processor 62 can acquire the timing instruction corresponding to the predetermined time in the timing information from the memory 63 when the predetermined time arrives, and control turning on or off the current of the circuit structure 64 according to the instruction. For example, whether contact points of the relay are closed is controlled according to the instruction, so as to determine whether to allow a current pass through the smart socket. The processor 62 may determine whether the predetermined time arrives by checking time itself, and when determining that the current time reaches at the predetermined time in the timing information stored in the memory, acquire the timing instruction corresponding to the timing from the memory. Alternatively, the processor may receive current time information from external sources. For example, the external sources may be a router, a server, or any other smart device.

The external sources may communicate with the smart socket wirelessly using a local area network, for example as shown in FIG. 1. The smart socket may be synchronized with the external sources by communicating the current time information.

Such manner of checking the time and controlling the instruction by the smart socket itself, compared to the above manner of sending the instruction by the router or the server, will be further independent of the network, regardless whether the wired or wireless network fails, the smart socket itself will control turn-on and turn-off on time according to the instruction, and thus the reliability is improved. Furthermore, in order to enable the smart socket itself to check the time more accurately, the smart socket may make time synchronization to a device, such as the server or the router, at a fixed time or period, so as to obtain a more accurate time.

In a further embodiment, several different copies of the timing instruction received by the smart socket may be maintained. For example, a copy of the timing information may be stored in the server, the router and the smart socket, and each of these three devices would check the time and send the timing instruction. This method of saving the timing information and making a timing control on a plurality of devices may improve the reliability, because as long as one of the three devices is functioning properly, the smart socket will be able to retrieve or receive the instruction, and the reaction to the predetermined time may be more accurate. However, in this way, the smart socket may receive redundant instructions. For example, when the predetermined time 10:00 arrives, the server determines that the time arrives and sends the instruction to the smart socket. The router also sends the instruction to the smart socket when determining that the time arrives, and the smart socket itself will receive the instruction. While, in fact, the instruction only needs to be executed once by the smart socket, the redundant instructions do not need to be executed all, and thus these other copies of the same instructions may be ignored. For example, the following redundant instructions may be ignored based on the same timing ID. Specifically, fi the first and second instruction received by the smart socket have the same timing ID, the second instruction may be ignored. In other example, the following redundant instructions may be ignored if the smart socket has been already operating according to the first instruction because the first instruction and the following redundant instructions have the smart socket do the same operation. Similarly, the timing information and a timing control can also be stored in both the smart socket and the router, so that the smart socket can also receive a plurality of same instructions.

Figure 7:
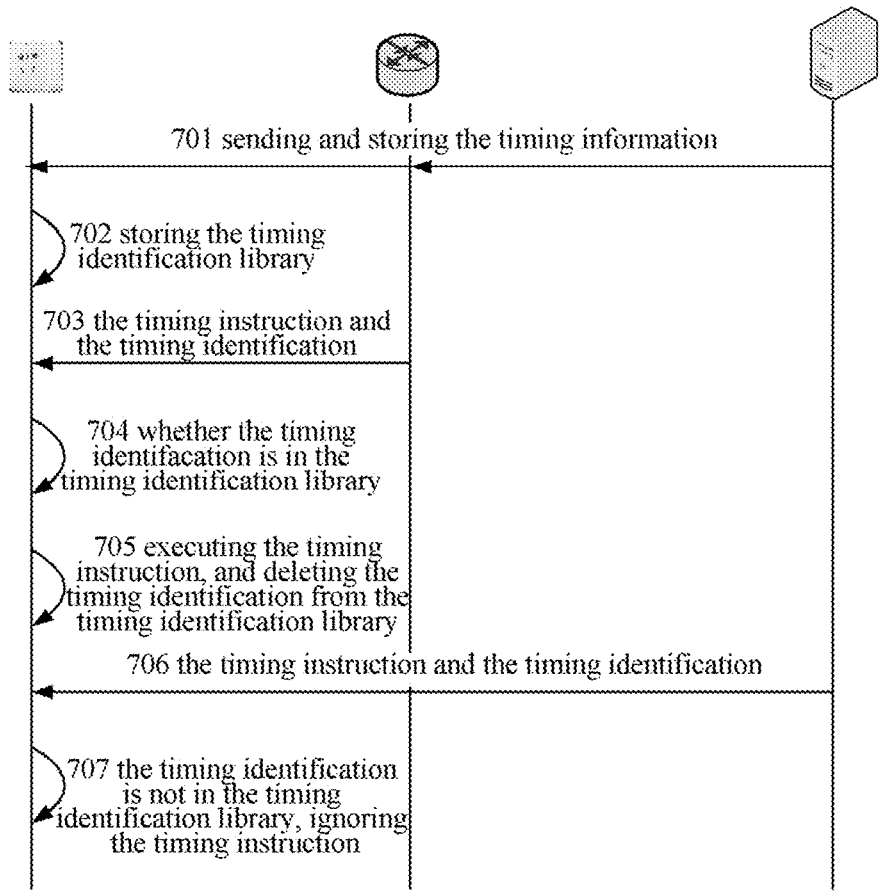
FIG. 7 is a flow chart of another application of a method for controlling turn-on and turn-off of a smart socket, according to an exemplary embodiment.

Based on this, the method of the present embodiment will be able to ensure that the same instruction is executed only once, Referring to the process shown in FIG. 7, in a scenario where all the server, the router and the smart socket store the timing information for example, the method may include the following steps.

At step 701, the server sends the timing information to the router and the smart socket. For example, after receiving the timing information sent by the user through the client installed in the smart phone, the server itself will store the timing information, and the server can send the timing information to the router and the smart socket. The router and the timing socket will also store the timing information respectively, and the timing information stored in these three devices is the same. It should be noted that, the timing information of the present embodiment includes the timing identification, as shown in the example of Table 1, the timing information may include a timing ID, a predetermined time and a timing instruction, both of which have the corresponding relationship. If the server can store the timing information of a plurality of smart sockets, the timing information can also include the device identification of the smart socket corresponding to the timing information, in order that the server can identify the smart socket corresponding to the timing instruction and the timing.

At step 702, the timing identification in the timing information received by the smart socket is stored in a timing identification library. For example, when receiving new timing information each time, the smart socket stores the timing identification in the timing information in the timing identification library, the timing identification library stores effective (i.e. unexecuted) timing identification corresponding to the timing instruction. When storing, these timing identifications may be stored as a form of a timing ID list, as shown in Table 2:

TABLE 2

| Timing ID list |
| Timing ID |
| --- |
| 00000001 |
| 00000002 |

In this way, the smart socket saves two parts of information, one part is the timing information, similar to that shown in Table 1; the other part is the timing ID list, similar to that shown in Table 2. The timing information of Table 1 is used for the smart socket to determine whether the predetermined time arrives according to the timing information and retrieve or receive the timing instruction. Table 2 is used for the smart socket to determine whether the timing ID corresponding to the received timing instruction is effective, and when the instruction is effective, the instruction may be executed, and the process proceeds to step 703.

At step 703, the smart socket receives the timing instruction and the corresponding timing identification sent by the router. Since all the smart socket, the router and the server store the same timing information, when determining that the predetermined time in the timing information arrives, any device would send the timing instruction. Three devices may send or receive the timing instruction at the same time. The present embodiment uses an example of receiving each instruction by the smart socket at different time respectively. Even when a plurality of instructions are received at the same time, the smart socket just handles one by one. Assume that the smart socket firstly receives the timing instruction sent by the router, which also carries the corresponding timing ID, or may also include other contents, such as the device identification, not detailed here. For instance, if it is the instruction corresponding to the timing ID00000001 in Table 1, and then the timing ID received by the smart socket is 00000001.

At step 704, the smart socket searches to determine whether the timing identification corresponding to the timing instruction is stored in the timing identification library. For example, the timing ID received by the smart socket is 00000001, the smart socket will check whether the ID is in the list of Table 2. If the ID is still in the timing ID list, it is indicated that the timing instruction corresponding to the ID has not yet been executed, and is still effective, then the smart socket continues to perform 705. Otherwise, it is indicated that the timing instruction corresponding to the ID has been executed, and ignore the instruction.

At step 705, the on and off of the current is controlled according to the timing instruction, and the timing identification is deleted from the timing identification library. For example, after the smart socket executes the timing instruction corresponding to the ID00000001, the ID is deleted from the timing ID list in Table 2. That is, the timing ID list only stores the timing identification corresponding to the unexecuted timing instruction.

At step 706, the smart socket receives the timing instruction and the corresponding timing identification sent by the server. This step assumes that the smart socket receives the timing instruction and the corresponding timing identification sent by the server later, both of which are the same as the information sent by the previous router, and are the same timing ID, 00000001. Optionally, when the smart socket receives the timing instruction and the corresponding timing identification sent by the server and the router at the same time, the smart socket just handles one by one, for example, firstly handles the instruction of the router according to the above 703-705, and then handles the instruction of the server according to 706 and 707.

At step 707, if the smart socket finds that the timing identification is not in the timing identification library, then it ignores the timing instruction. For example, the smart socket also needs determine whether the timing identification corresponding the timing instruction is stored in the timing identification library, according to the step in 704. Since the smart socket has deleted the timing identification from the timing ID list after the instruction is executed in 705, in the present step, the smart socket will find that the timing ID00000001 is not in the timing ID list, and the smart socket can determine that the instruction corresponding to the ID has been executed according to this, and thus ignoring the instruction, i.e. the instruction will not be executed.

Figure 8:
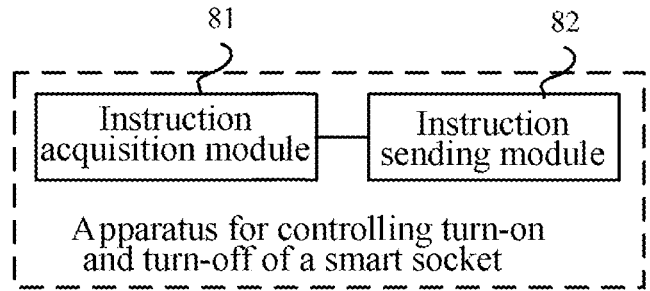
FIG. 8 is a structural block diagram of an apparatus for controlling turn-on and turn-off of a smart socket, according to an exemplary embodiment.

FIG. 8 provides a structural block diagram of an apparatus for controlling turn-on and turn-off of a smart socket. The apparatus may be applied in a control device, such as a router. As shown in FIG. 8, the apparatus may include an instruction acquisition module 81 and an instruction sending module 82.

The instruction retrieving module 81 is configured to, when determining that current time arrives at a predetermined time, retrieve stored timing information, the timing information including a corresponding smart socket, the predetermined time, and a timing instruction corresponding to the predetermined time.

The instruction sending module 82 is configured to send the timing instruction to the corresponding smart socket via a local area network. The timing instruction being used for controlling the smart socket to control on and off of an electric current of the smart socket according to the timing instruction.

Figure 9:
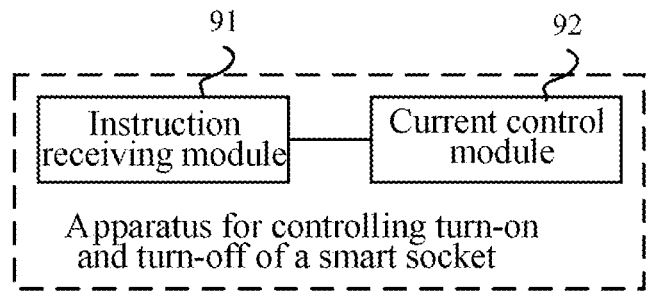
FIG. 9 is a block diagram of an apparatus for controlling turn-on and turn-off of a smart socket, according to an exemplary embodiment.

FIG. 9 provides a structural block diagram of an apparatus for controlling turn-on and turn-off of a smart socket. The apparatus may be applied in the smart socket, so that the smart socket may perform the method for controlling turn-on and turn-off of the smart socket of embodiments of the present disclosure. For example, the apparatus may be logic instructions, which may be called by a processor, stored in the memory of the smart socket shown in FIG. 6. Detailed description of specific manner for conducting operation of various modules in the apparatus has been made in the embodiment related to the method, no detailed illustration will be made herein. As shown in FIG. 9, the apparatus include an instruction receiving module 91 and a current control module 92.

The instruction receiving module 91 is configured to receive a timing instruction used for controlling on and off of an electric current of the smart socket. The timing instruction is locally stored, or stored in a control device sending the timing instruction via a local area network.

The current control module 92 is configured to control on and off of the electric current according to the timing instruction.

Figure 10:
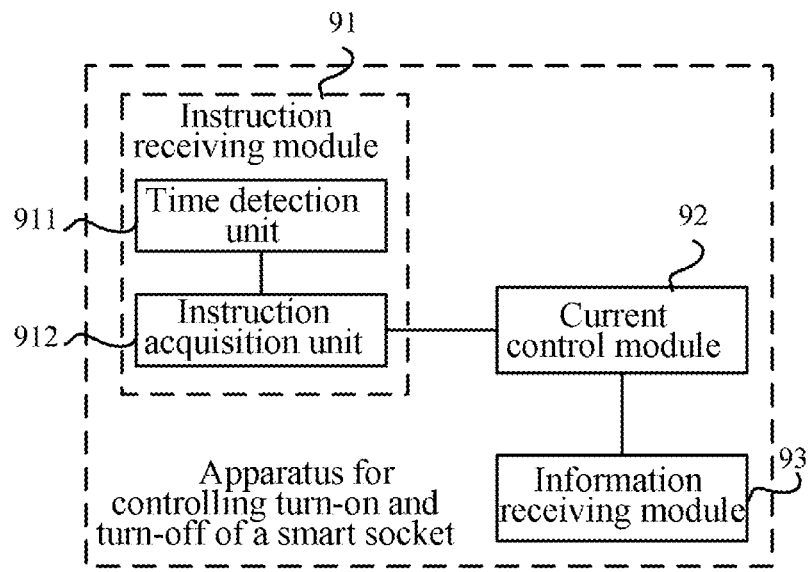
FIG. 10 is a block diagram of another apparatus for controlling turn-on and turn-off of a smart socket, according to an exemplary embodiment.

FIG. 10 illustrates a structure of another apparatus for controlling turn-on and turn-off of a smart socket. Based on the structure shown in FIG. 9, the apparatus may further include an information receiving module 93.

The information receiving module 93 is configured to receive timing information which includes a timing, a timing instruction corresponding to the predetermined time, and a timing identification. The timing identification is stored in a timing identification library.

The instruction receiving module 91 is further configured to, when receiving the timing instruction used for controlling on and off of the current, receive a timing identification corresponding to the timing instruction.

The current control module 92 is configured to determine whether a timing identification corresponding to the timing instruction is stored in the timing identification library. When the timing identification is stored in the timing identification library, the current control module 92 controls on and off of the current according to the timing instruction, and deletes the timing identification corresponding to the timing instruction from the timing identification library.

Furthermore, the instruction receiving module 91 may include a time determination unit 911 and an instruction receiving unit 912. The time determination unit 911 is configured to determine whether current time arrives at a timing in stored timing information. The instruction receiving unit 912 is configured to receive timing instruction corresponding to the predetermined time in the timing information.

Figure 11:
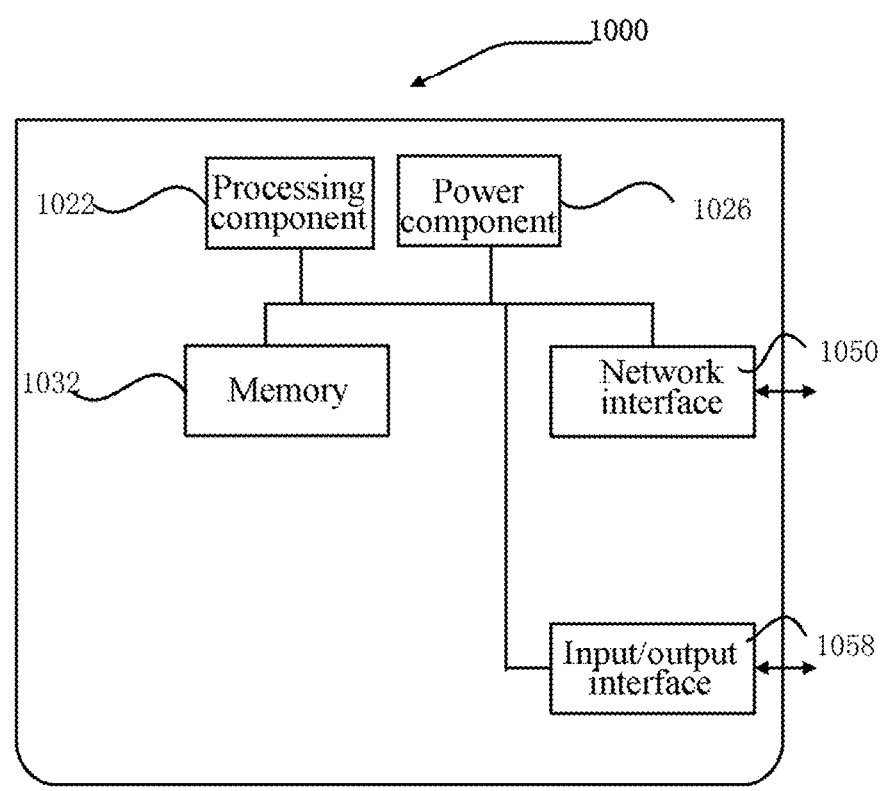
FIG. 11 is a block diagram of a control device, according to an exemplary embodiment.

FIG. 11 is a block diagram of a control device 1000, according to an exemplary embodiment. For example, the control device 1000 is a server. The control device 1000 may include a processing component 1022, which further includes one or more processors and a storage resource represented by a memory 1032 for storing instructions such as an application program executable by the processing component 1022. The application program stored in the memory 1032 may include one or more modules each corresponding to a set of instructions. In addition, the processing component 1022 is configured to execute instructions to perform the above methods: when determining that current time arrives at a timing time, retrieving stored timing information, the timing information including a corresponding smart socket, the predetermined time, and a timing instruction corresponding to the predetermined time; and sending the timing instruction to the corresponding smart socket via a local area network, the timing instruction being used for controlling the smart socket to control on and off of an electric current of the smart socket according to the timing instruction.

The router 1000 further includes a power component 1026 configured to perform power management for the device 1000, a wired or wireless network interface 1050 configured to connect the device 1000 to network, and an input/output (I/O) interface 1058. The device 1000 may be operated based on an operating system such as Windows Server™, Mac OS X™, Unix™, Linux™, FreeBSD™, or the like stored in the memory 1032.

In an exemplary embodiment of the present disclose, there is also provided a non-transitory computer-readable storage medium including instructions, such as included in the memory, executable by the processor, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for controlling turn-on or turn-off of an electric current supplied by a smart socket, comprising:
   in response to determining that a current time has reached a predetermined time:
      retrieving, by a control device, timing information stored in the control device, the timing information including a smart socket identifier, the predetermined time, and a timing instruction corresponding to the predetermined time; and
      transmitting, by the control device, the timing instruction to a smart socket associated with the smart socket identifier via a local area network, wherein:
         the timing instruction comprises instructions to configure the smart socket to search a timing identification library to determine whether a timing identification corresponding to the timing instruction is stored in the timing identification library,
         in response to a determination that the timing identification corresponding to the timing instruction is not stored in the timing identification library, the timing instruction further comprises instructions to cause the smart socket to:
            determine that the timing identification corresponding to the timing instruction has been executed, and
            ignore the timing instruction, and
         in response to a determination that the timing identification corresponding to the timing instruction is stored in the timing identification library, the timing instruction further comprises instructions to cause the smart socket to:
            control, according to the timing instruction, an electric current being supplied to a device connected to the smart socket, and
            delete the timing identification corresponding to the timing instruction from the timing identification library.

2. The method according to claim 1, further comprising receiving timing information for controlling turn-on or turn-off of an electric current supplied by the smart socket.

3. The method according to claim 1, wherein, when there are a plurality of smart sockets associated with a plurality of timing instructions, sending respective timing instruction to each of the smart sockets along with a smart socket identifier for each of the smart sockets.

4. The method according to claim 1, wherein, the timing information further comprises: a timing identification corresponding to the timing instruction, the timing identification being used for enabling the smart socket to execute the timing instruction when the timing identification is stored in a timing identification library of the smart socket.

5. A method for controlling turn-on and turn-off of an electric current supplied by a smart socket, comprising:
   obtaining, by a smart socket, timing information used for controlling an electric current supplied by the smart socket to an electric device connected to the smart socket, the timing information being stored in the smart socket, or being stored in a control device sending the timing information via a local area network;
   searching, by the smart socket, a timing identification library to determine whether a timing identification corresponding to the timing information is stored in the timing identification library;
   in response to a determination that the timing identification corresponding to the timing information is not stored in the timing identification library:
      determining that the timing identification corresponding to the timing information has been executed, and
      ignoring the timing information; and
   in response to a determination that the timing identification corresponding to the timing information is stored in the timing identification library:
      controlling, by the smart socket, the electric current based on the timing information, and
      deleting the timing identification corresponding to the timing information from the timing identification library.

6. The method according to claim 5, wherein the timing information stored in the smart socket comprises a timing instruction and a predetermined time corresponding to the timing instruction, and
   the obtaining the timing instruction used for controlling the electric current comprises:
      when determining that current time has reached at the predetermined time, retrieving the timing instruction.

7. The method according to claim 5, wherein obtaining the timing information used for controlling the electric current comprises obtaining a timing identification corresponding to the timing information;
   before obtaining the timing information used for controlling the electric current, the method further comprises:
      obtaining timing information, the timing information including a predetermined time, a timing instruction corresponding to the predetermined time, and a timing identification, the timing identification being stored in the timing identification library of the smart socket.

8. A control device, comprising:
   a processor; and
   a memory for storing instructions executable by the processor,
   wherein the processor is configured to:
      in response to determining that current time has reached a predetermined time, retrieve timing information stored in the control device, the timing information including a smart socket identifier, the predetermined time, and a timing instruction corresponding to the predetermined time; and send the timing instruction to a smart socket associated with the smart socket identifier via a local area network, so that the smart socket is configured to:
receive the timing instruction from the control device,
search a timing identification library to determine whether a timing identification corresponding to the timing instruction is stored in the timing identification library,
in response to a determination that the timing identification corresponding to the timing instruction is not stored in the timing identification library:
determine that the timing identification corresponding to the timing instruction has been executed, and
ignore the timing instruction, and
in response to a determination that the timing identification corresponding to the timing instruction is stored in the timing identification library:
control an electric current supplied by the smart socket to an electric device connected to the smart socket based on the timing instruction, and
delete the timing identification corresponding to the timing instruction from the timing identification library.

9. The control device according to claim 8, wherein the control device is a router.

10. The control device according to claim 8, wherein the processor is configured to perform:
when there are a plurality of smart sockets associated with a plurality of timing instructions, sending respective timing instruction to each of the smart sockets along with a smart socket identifier for each of the smart sockets.

11. The control device according to claim 8, wherein the processor is configured to:
when there are a plurality of smart sockets associated with a plurality of timing instructions, send respective timing instruction to each of the smart sockets along with a smart socket identifier for each of the smart sockets.

12. The control device according to claim 8, wherein, the timing information further comprises: a timing identification corresponding to the timing instruction, the timing identification being used for enabling the smart socket to execute the timing instruction when the timing identification is stored in a timing identification library of the smart socket.

13. A smart socket, comprising:
a processor; and
a memory for storing instructions executable by the processor, wherein the processor is configured to:
retrieve a timing instruction used for controlling an electric current supplied by the smart socket, the timing instruction being stored in the smart socket, or being stored in a control device sending the timing instruction via a local area network,
search a timing identification library to determine whether a timing identification corresponding to the timing instruction is stored in the timing identification library,
in response to a determination that the timing identification corresponding to the timing instruction is not stored in the timing identification library:
determine that the timing identification corresponding to the timing instruction has been executed, and
ignore the timing instruction, and
in response to a determination that the timing identification corresponding to the timing instruction is stored in the timing identification library:
control the electric current based on the timing instruction, and
delete the timing identification corresponding to the timing instruction from the timing identification library.

14. The smart socket according to claim 13, wherein, when the timing instruction is received by the smart socket, timing information is stored in the memory, the timing information including a predetermined time, and the timing instruction corresponding to the predetermined time, and
the processor is further configured to: in response to determining that current time has reached the predetermined time in the timing information stored in the memory, retrieve the timing instruction corresponding to the predetermined time from the memory, and control the electric current based on the timing instruction.

15. The smart socket according to claim 14, wherein the timing information stored in the memory further comprises the timing identification,
the timing identification library including the timing identification is further stored in the memory.

16. The control device according to claim 8, wherein the processor is configured to perform:
receiving timing information for controlling turn-on and turn-off of the smart socket from a server.

17. The control device according to claim 8, wherein the processor is configured to perform:
determining the smart socket among a plurality of smart sockets based on a device identification in the timing information.

* * * * *